US010025490B2

(12) United States Patent
Cai

(10) Patent No.: US 10,025,490 B2
(45) Date of Patent: Jul. 17, 2018

(54) METHOD, DEVICE AND COMPUTER STORAGE MEDIUM FOR MULTICHANNEL TOUCH CONTROL OF ALL-IN-ONE MACHINE

(71) Applicant: Guangzhou Shirui Electronics Co., Ltd., Guangdong (CN)

(72) Inventor: Wensheng Cai, Guangdong (CN)

(73) Assignee: GUANGZHOU SHIRUI ELECTRONICS CO., LTD., Guangdong (CN)

( * ) Notice: Subject to any disclaimer, the term of this patent is extended or adjusted under 35 U.S.C. 154(b) by 142 days.

(21) Appl. No.: 14/781,516

(22) PCT Filed: Apr. 4, 2014

(86) PCT No.: PCT/CN2014/074854
§ 371 (c)(1),
(2) Date: Sep. 30, 2015

(87) PCT Pub. No.: WO2014/166369
PCT Pub. Date: Oct. 16, 2014

(65) Prior Publication Data
US 2016/0054885 A1    Feb. 25, 2016

(30) Foreign Application Priority Data

Apr. 7, 2013  (CN) .......................... 2013 1 0118679
Apr. 7, 2013  (CN) .......................... 2013 1 0118703
Apr. 7, 2013  (CN) .......................... 2013 1 0118741

(51) Int. Cl.
*G09G 5/00*       (2006.01)
*G06F 3/0488*     (2013.01)
(Continued)

(52) U.S. Cl.
CPC .......... *G06F 3/0488* (2013.01); *G06F 3/0416* (2013.01); *G06F 3/0481* (2013.01);
(Continued)

(58) Field of Classification Search
CPC ........ G06F 3/0488; G06F 3/12; G06F 3/0481; G06F 3/0416; G06F 2203/04104; G06T 11/60; G06T 11/001
(Continued)

(56) References Cited

U.S. PATENT DOCUMENTS

2005/0007442 A1   1/2005  Kay
2005/0179816 A1   8/2005  Matsumura
(Continued)

FOREIGN PATENT DOCUMENTS

CN     1538735 A    10/2004
CN     1638459 A    7/2005
(Continued)

OTHER PUBLICATIONS

International Search Report for Application No. PCT/CN2014/074854, dated Jan. 13, 2017, 18 pages.
(Continued)

*Primary Examiner* — Jennifer Nguyen
(74) *Attorney, Agent, or Firm* — Steptoe & Johnson LLP

(57) ABSTRACT

A method, device and computer storage medium for multichannel touch control of an all-in-one machine are disclosed. The method for multichannel touch control of the all-in-one machine includes: providing a channel display window on a user interface, and setting up link buttons between the channel display window and each channel; setting up a multichannel touch control component on the user interface, receiving touch point information from a user, converting the touch point information into corresponding multichannel operation information, and performing corresponding opera-
(Continued)

tion on each channel based on the multichannel operation information. The contents of the multiple channels can be displayed by providing a channel display window on the user interface of the all-in-one machine; with the multichannel touch control component set up on the user interface, the touch control operation on the multiple channels at the same time can be activated. For example, the content of the multiple channels can be annotated, captured or printed at the same time, which improves the efficiency of operations on the multiple channels.

18 Claims, 13 Drawing Sheets

(51) Int. Cl.
  *G06F 3/041* (2006.01)
  *G06F 3/0481* (2013.01)
  *G06F 3/12* (2006.01)
  *G06T 11/00* (2006.01)
  *G06T 11/60* (2006.01)
  *G06F 3/0484* (2013.01)

(52) U.S. Cl.
  CPC ........ *G06F 3/0484* (2013.01); *G06F 3/04883* (2013.01); *G06F 3/12* (2013.01); *G06F 3/1206* (2013.01); *G06F 3/1253* (2013.01); *G06F 3/1285* (2013.01); *G06T 11/001* (2013.01); *G06T 11/60* (2013.01); *G06F 2203/04104* (2013.01); *G06F 2203/04803* (2013.01); *G06T 2207/10024* (2013.01)

(58) Field of Classification Search
  USPC ................ 345/173–178, 156–157; 715/863
  See application file for complete search history.

(56) References Cited

U.S. PATENT DOCUMENTS

| | | | |
|---|---|---|---|
| 2005/0273700 A1 | 12/2005 | Champion et al. | |
| 2007/0041029 A1 | 2/2007 | Yoo | |
| 2007/0101260 A1 | 5/2007 | Kusakabe | |
| 2010/0318921 A1 | 12/2010 | Trachtenberg et al. | |
| 2011/0085016 A1* | 4/2011 | Kristiansen | G06F 3/04883 348/14.03 |
| 2011/0234518 A1 | 9/2011 | Maruyama | |
| 2012/0098763 A1 | 4/2012 | Song | |
| 2012/0110431 A1 | 5/2012 | Rosenfeld et al. | |
| 2012/0307103 A1 | 12/2012 | Kunishige | |
| 2013/0077822 A1* | 3/2013 | Fredlund | G06F 3/1205 382/103 |

FOREIGN PATENT DOCUMENTS

| | | |
|---|---|---|
| CN | 1917548 A | 2/2007 |
| CN | 1959678 A | 5/2007 |
| CN | 101206640 A | 6/2008 |
| CN | 101477440 A | 7/2009 |
| CN | 101968716 A | 2/2011 |
| CN | 102202151 A | 9/2011 |
| CN | 102263706 | 11/2011 |
| CN | 102419743 A | 4/2012 |
| CN | 102497521 A | 6/2012 |
| CN | 102546905 A | 7/2012 |
| CN | 102663791 A | 9/2012 |
| CN | 102707879 A | 10/2012 |
| CN | 102811306 A | 12/2012 |
| CN | 103197854 A | 7/2013 |
| CN | 103197904 A | 7/2013 |
| CN | 103207731 A | 7/2013 |
| CN | 2697983 A | 5/2015 |
| JP | 2005035297 A | 2/2005 |

OTHER PUBLICATIONS

Christoph Güntner, "Screenshots erstellen unter Windows", Mar. 20, 2013, from the Internet, 1 page.
Christoph Güntner, "Tipps & Tricks rund um Clipboard Master, die clevere Mehrfach-Zwischenablage", Nov. 19, 2012, from the Internet, 1 page.
International Search Report and Written Opinion for PCT/CN2014/074854, dated Jul. 15, 2014; 15 pgs.
Search Report and First Office Action for Chinese Appl. No. 201310118741.5, dated May 5, 2015; 10 pages.
Second Office Action for Chinese Appl. No. 201310118741.5, dated Nov. 25, 2015; 11 pages.
Search Report and First Office Action for Chinese Appl. No. 201310118703.X; dated May 6, 2015; 5 pages.
Second Office Action for Chinese Appl. No. 201310118703.X; dated Mar. 4, 2016; 6 pages.
Search Report and First Office Action for Chinese Pat. Appl. No. 201310118679.X; dated Apr. 3, 2015; 10 pages.
Second Office Action for Chinese Pat. Appl. No. 201310118679.X, dated Nov. 6, 2015; 12 pages.

* cited by examiner

METHOD, DEVICE AND COMPUTER STORAGE MEDIUM FOR MULTICHANNEL TOUCH CONTROL OF ALL-IN-ONE MACHINE

CROSS REFERENCE TO RELATED APPLICATIONS

This patent application is a national stage of International Application No. PCT/CN2014/074854, filed Apr. 4, 2014, which claims priority to the Chinese patent application nos. CN 201310118741.5, filed Apr. 7, 2013; CN 201310118703.X, filed Apr. 7, 2013; and CN 201310118679.X, filed Apr. 7, 2013, the disclosures of which are incorporated herein by reference.

FIELD

The present invention relates generally to the field of multichannel display control of an all-in-one machine, and more particularly, to a method for multichannel touch control of an all-in-one machine, a device for multichannel touch control of an all-in-one machine, and a computer storage medium storing the method.

BACKGROUND

An all-in-one machine is an integrative equipment which combines the functions of TV, touch and PC. At the present, most of all-in-one machines have the function of channel switching between VGA, HDMI, AV and YPBPR channels. However, only the content of one channel can be displayed at one time for the traditional switching between these channels. In a practical application, a user may perform an operation in a channel (referred to as channel A) firstly, and switch to a target channel (referred to as channel B) by a switch menu or button. The channel B may be displayed after system processing, and the user may perform some operations in the channel B, and then switch back to the channel A in the same way. The frequent switches in this way may be a tedious and time consuming process to the user.

When performing operations respectively to the content of each of the channels, the user has to continuously change the channel currently displayed, making the whole process become cumbersome and inconvenient.

SUMMARY

In view of the problem existing in the prior art, an object of the present invention is to provide a method for multichannel touch control of an all-in-one machine, which does not require switching the channel one after another and is convenient for the user's operation when performing operations on the display content of the multiple channels in the all-in-one machine.

According to one aspect of the present invention, a method for multichannel touch control of an all-in-one machine is provided, including:

step 1, providing a channel display window on a user interface, and setting up link buttons between the channel display window and corresponding channels respectively; and step 2, setting up a multichannel touch control component on the user interface, receiving touch point information from a user, converting the touch point information into corresponding multichannel operation information, and performing operation on each channel based on the multichannel operation information.

In the method for multichannel touch control of an all-in-one machine, the display content of the multiple channels can be displayed by providing a channel display window on the user interface of the all-in-one machine, and with the multichannel touch control component set up on the user interface, the touch control operation on the multiple channels at the same time can be activated, for example, the display content of the multiple channels can be annotated, captured or printed at the same time, without having to respectively switch to the respective channel before performing the corresponding operation in the channel. In addition, it is convenient to switch between the multiple channels by the respective link button set up between the channel display window and the respective channel.

In one embodiment, the step 2 includes: providing a transparent annotation window above the channel display window, receiving touch point information from a user, converting the touch point information into annotations, and storing the annotations corresponding to each of the channels respectively. In the embodiment, the transparent annotation window overlays the channel display window, but the transparent annotation window is transparent, so the feel of the image cannot be affected. The transparent annotation window can receive touch point information of the user, and covert the touch point information into a visual figure, character or line, which can be shown on the image as an annotation. The annotations respectively corresponding to each of the channels can be stored so as to display each of the annotations on the image at the same time. In the meantime, the present invention is convenient to capture the display images respectively corresponding to each of the channel, to enhance the user experience. In particular, the image of the channel display window with an annotation can be captured that the image with the annotation can be stored.

In another embodiment, the step 2 includes: setting up an image-capturing activation button on the user interface, and receiving the touch point information of the user after activating the image-capturing activation button; and creating an image-capturing box based on the touch point information, and storing the images captured by the image-capturing box respectively corresponding to each of the channel. In the embodiment, it is convenient to capture the display images respectively corresponding to each of the channel, to enhance the user experience. In particular, the image of the channel display window with an annotation can be captured that the image with the annotation can be stored.

In another embodiment, the step 2 includes: setting up a print activation button on the user interface, and receiving the touch point information of the user after activating the print activation button; and acquiring print areas based on the touch point information, putting the print areas respectively corresponding to each of the channels into the same print task, and outputting the print task to complete the print. In the embodiment, it is convenient to put the pages to be printed in respective channels into the same print task to output without switching the system, which saves testing time. The pages of all of the channels can be printed by driving an external printer only once, which does not take up too much of the channel resources of the printer. In particular, the image of the whole screen with the annotation in each channel can be printed, the image shown on the whole channel display window can be also printed, and a certain area captured from the channel display window can be further printed. The above same print task includes at least one page to be printed.

In view of the problem existing in the prior art that the multichannel operations on the all-in-one machine require switching the display channel over and over to perform operations on each of the corresponding channels, which is inconvenient, another object of the present invention is to provide a device for multichannel touch control of an all-in-one machine, which does not require switching the channel one after another and is convenient for the user's operation when performing operations on the display content of the multiple channels in the all-in-one machine.

According to another aspect of the present invention, a device for multichannel touch control of an all-in-one machine is provided, including:

a window editing unit, configured to provide a channel display window on a user interface, and set up link buttons between the channel display window and corresponding channels respectively; and a touch control unit, configured to set up a multichannel touch control component on the user interface, receive touch point information from a user, convert the touch point information into corresponding multichannel operation information, and perform respective operation on each channel based on the multichannel operation information.

In the device for multichannel touch control of an all-in-one machine, the display content of the multiple channels can be displayed by providing a channel display window on the user interface of the all-in-one machine with the window editing unit. The touch control unit can set up the multichannel touch control component on the user interface, and the touch control operation on the multiple channels at the same time can be activated with the multichannel touch control component, for example, the display content of the multiple channels can be annotated, captured or printed at the same time, without having to respectively switch to the respective channel before performing the corresponding operation in the channel. In addition, it is convenient to switch between the multiple channels by the respective link button set up between the channel display window and the respective channel.

In view of the problem existing in the prior art that the multichannel operations on the all-in-one machine require switching the display channel over and over to perform operations on each of the corresponding channels, which is inconvenient, a further object of the present invention is to provide a computer-readable storage medium storing computer-executable instructions which, when executed, perform the method for multichannel touch control of the all-in-one machine.

DETAILED DESCRIPTION OF THE PREFERRED EMBODIMENTS

A method for multichannel touch control of an all-in-one machine includes:

step 1, providing a channel display window on a user interface, and setting up link buttons between the channel display window and corresponding channels respectively; and step 2, setting up a multichannel touch control component on the user interface, receiving touch point information from a user, converting the touch point information into corresponding multichannel operation information, and performing operation on each channel based on the multichannel operation information.

In the method for multichannel touch control of an all-in-one machine, the display content of the multiple channels can be displayed by providing a channel display window on the user interface of the all-in-one machine, and with the multichannel touch control component set up on the user interface, the touch control operation on the multiple channels at the same time can be activated, for example, the display content of the multiple channels can be annotated, captured or printed at the same time, without having to respectively switch to the respective channel before performing the corresponding operation in the channel. In addition, it is convenient to switch between the multiple channels by the respective link button set up between the channel display window and the respective channel.

The channel display window may be set up in an Android system, and the channel display window may display the display content of the multiple channels at the same time, for example, the channel display window may display the content of all of the multiple channels in a plurality of sub windows which correspond to the multiple channels respectively. The channel display window may also be switched to display content of a certain channel alone, for example, when it is switched to a certain channel, the content corresponding to the channel may be displayed in the whole channel display window while the content of other channels may be hidden. Preferably, both of the size and location of the channel display window may be adjusted.

As a means to implement the link button, a drop-down box may be created in the menu bar, which includes a link button of each channel. When a link button is activated, the all-in-one machine can be switched from the current channel to another channel corresponding to the link button, and the image of the channel may be display in the channel display window.

Figure 1:
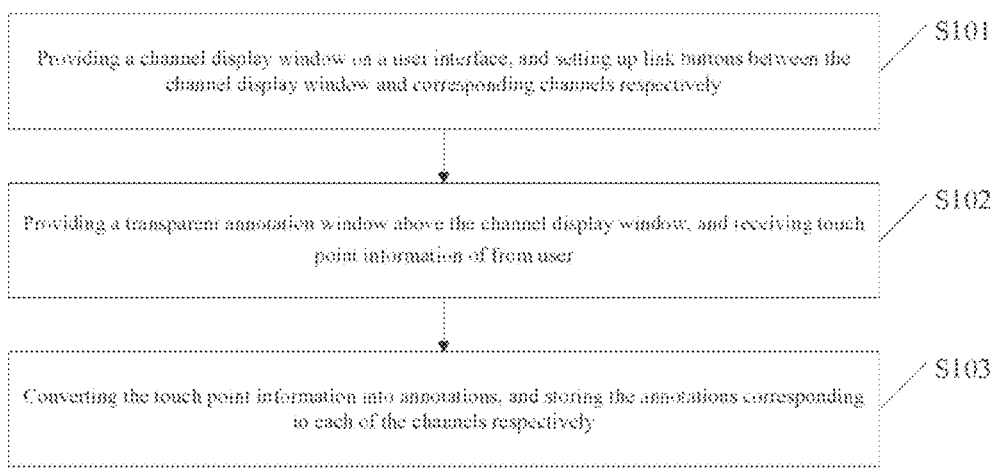
FIG. 1 is a flow diagram illustrating a method for multichannel touch control of an all-in-one machine according to Example One of the present invention.

Please refer to FIG. 1, which is a flow diagram illustrating a method for multichannel touch control of an all-in-one machine according to Example One of the present invention.

In the example, the method for multichannel touch control of an all-in-one machine can implement annotations for the multiple channels, including:

S101, providing a channel display window on a user interface, and setting up link buttons between the channel display window and corresponding channels respectively;

S102, providing a transparent annotation window above the channel display window, and receiving touch point information from a user; and S103, converting the touch point information into annotations, and storing the annotations corresponding to each of the channels respectively.

In the embodiment, the transparent annotation window overlays the channel display window, but the transparent annotation window is transparent, so the feel of the image cannot be affected. The transparent annotation window can receive touch point information of the user, and covert the touch point information into a visual figure, character or line, which can be shown on the image as an annotation. The annotations respectively corresponding to each of the channels can be stored so as to display each of the annotations on the image at the same time. Thus it is convenience for the method according to the present invention to make annotations for all of the channels, to enhance the user experience.

Figure 2:
FIG. 2 is a flow diagram shown an embodiment of a method for multichannel touch control of an all-in-one machine to implement annotations in multiple channels according to one embodiment of the present invention.

FIG. 2 is a flow diagram shown an embodiment of a method for multichannel touch control of an all-in-one machine to implement annotations in multiple channels according to one embodiment of the present invention. The method includes:

S201, providing a channel display window on a user interface, and setting up link buttons between the channel display window and corresponding channels respectively;

S202, providing a transparent annotation window above the channel display window, and receiving touch point information from a user;

S203, collecting the touch point information according to the type of the annotation including graphic annotation, line annotation and/or text annotation;

S204, connecting the touch points into a line with a predefined color, to form an annotation, and displaying the annotation on the channel preview window in the current channel corresponding to the annotation;

S205, creating a graphic file package, a line file package and/or text file package respectively; S206, storing the annotation in a corresponding file package according to the type of the annotation, together with a coordinate location of the annotation with respect to the channel corresponding to the annotation;

S207, calling all of the annotations corresponding to the current channel from all file packages after switching to the current channel, and displaying the annotations according to their coordinate locations respectively.

The technical solution includes an Android user interface, a channel display window and a transparent annotation window configured to display an annotation. The channel display window is arranged on the Android user interface, and the size and location of the channel display window is adjustable. The transparent annotation window may overlay the channel display window.

With the present invention, the image information of other channels can be displayed on the area of the channel display window in the current user interface in real time, and it is possible to make an annotation at any location of the whole display screen. The present invention uses a three-tier structure, including an Android user interface layer, a channel display window layer and a transparent annotation layer. The Android user interface layer, as the lowest layer, is configured to display the current interface and control the location of the channel display window. The channel display window layer, as the middle layer, is configured to display information of other channels, and it would have to depend on the Android user interface layer which is used as a carrier. The transparent annotation layer, as the uppermost layer, is configured to receive user input and display annotations.

Specifically, the Android user interface layer may be implemented by the Activity of the Android, the channel display window layer may be implemented by the SurfaceView of the Android, and the transparent annotation layer may also be implemented by the SurfaceView of the Android.

When the transparent annotation window of the transparent annotation layer is in a writing mode to receive touch events of the user, the transparent annotation layer is responsible for processing the point data and forming a certain graphic element which may be display on the SurfaceView of this layer. Because this layer is transparent, the annotation looks like an annotation directly made on the channel display window layer. The writing mode can be determined by the type or pattern of the annotation.

In one embodiment, the types of the annotation include graphic annotation, line annotation and/or text annotation, and the wiring mode includes:

collecting the touch point information according to the type of the annotation; and connecting the touch points into a line with a predefined color, to form an annotation, and displaying the annotation on the channel preview window in the current channel corresponding to the annotation.

Preferably, according to the information of the touch points, the starting point where the touch starts, the end point where the touch is end, and the sampling points between the starting point and the end point may be connected into a line. Preferably, if the sampling rate is high, an irregular line may be formed according to the touch of the user. If the type of the annotation is a graphic annotation, the starting point and the starting point may be connected to form a closed region. The annotation may be displayed on the image with a predefined color, such as red.

In addition, the graphic annotation or line annotation that has been formed may be edited by some operation, such as deletion or adding text. The deletion means cancelling the annotation. The adding text means adding a text annotation onto the graphic annotation or line annotation.

In another embodiment, the annotation includes a graphics library and a line library storing preset patterns. The wiring mode includes:

selecting the target style from the graphics library or the line library;

extracting starting point and end point coordinates from the touch point information; and drawing a graphic element or a line of the target style between the starting point and the end point to form an annotation, and displaying the annotation on the channel preview window in the current channel corresponding to the annotation.

Different from the previous embodiment, basic types of annotation have been established in this embodiment, so a graphic element or line of the selected target style can be drawn between the starting point and the end point once the coordinates of the starting point and the end point have been acquired. The annotation formed may be a straight line, a wave line, a circle, a rectangle or other basic patterns.

It can be seen that the operation of the annotation is only implemented by the transparent annotation layer.

In order to perform operations on the middle channel display window layer when the transparent annotation layer is under operations, a rectangular region object with the same size of the channel display winder layer is defined in the transparent annotation layer, which is called as a transparent annotation window. When the user performs a selecting operation on the transparent annotation window, whether the operation is within the rectangular region of the channel display window is determined, and if so, the operation will be executed in the rectangular region. The result of the execution may be informed to the Android user interface layer, and the Android user interface layer may adjust the size or location of the channel display window. The operations on the channel display window may include moving and zooming in and out. In addition, there may be a link button for changing channel. When performing operations on the channel display window, a drop-down box with a list of available channels may be provided that if the user selects a channel, the channel display window layer may switch to the channel for display.

In addition, the present invention may create a graphic file package, a line file package and/or text file package respectively, configured to store various types or patterns of the annotation, which is convenience for calling. The annotation may be stored in a corresponding file package according to its type, together with its coordinate location with respect to the channel corresponding to the annotation. In this way, it is known an annotation will be displayed on which location of which channel.

All of the annotations corresponding to the current channel may be called from all file packages after switching to the current channel, and the annotations may be displayed according to their coordinate locations respectively. Thus, even switching the channel, the annotation will not be lost.

Figure 3:
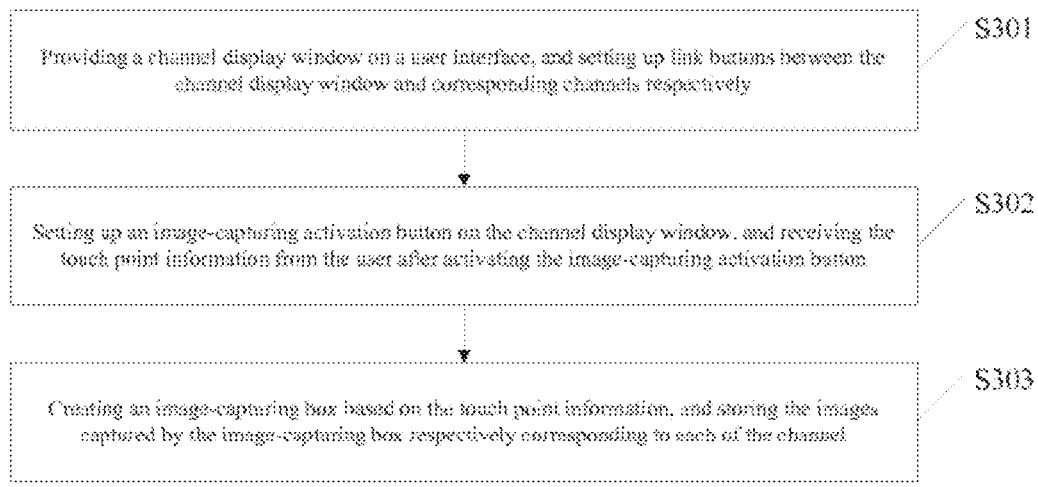
FIG. 3 is a flow diagram illustrating a method for multichannel touch control of an all-in-one machine according to Example Two of the present invention.

Please refer to FIG. 3, which is a flow diagram illustrating a method for multichannel touch control of an all-in-one machine according to Example Two of the present invention. In the example, the method for multichannel touch control of an all-in-one machine can implement image-capturing for the multiple channels, including:

S301, providing a channel display window on a user interface, and setting up a link button between the channel display window and a corresponding channel;

S302, setting up an image-capturing activation button on the channel display window, and receiving the touch point information of the user after activating the image-capturing activation button; and S303, creating an image-capturing box based on the touch point information, and storing the images captured by the image-capturing box respectively corresponding to each of the channel.

In the embodiment, in combination with the method according to the Example One, a transparent annotation window may overlay the channel display window, which is transparent, so the feel of the image cannot be affected. The transparent annotation window can receive touch point information of the user, and covert the touch point information into a visual figure, character or line, which can be shown on the image as an annotation. The annotations respectively corresponding to each of the channels can be stored so as to display each of the annotations on the image at the same time. In the meantime, the present invention is convenient to capture the display images respectively corresponding to each of the channel, to enhance the user experience. In particular, the image of the channel display window with an annotation can be captured that the image with the annotation can be stored.

Figure 4:
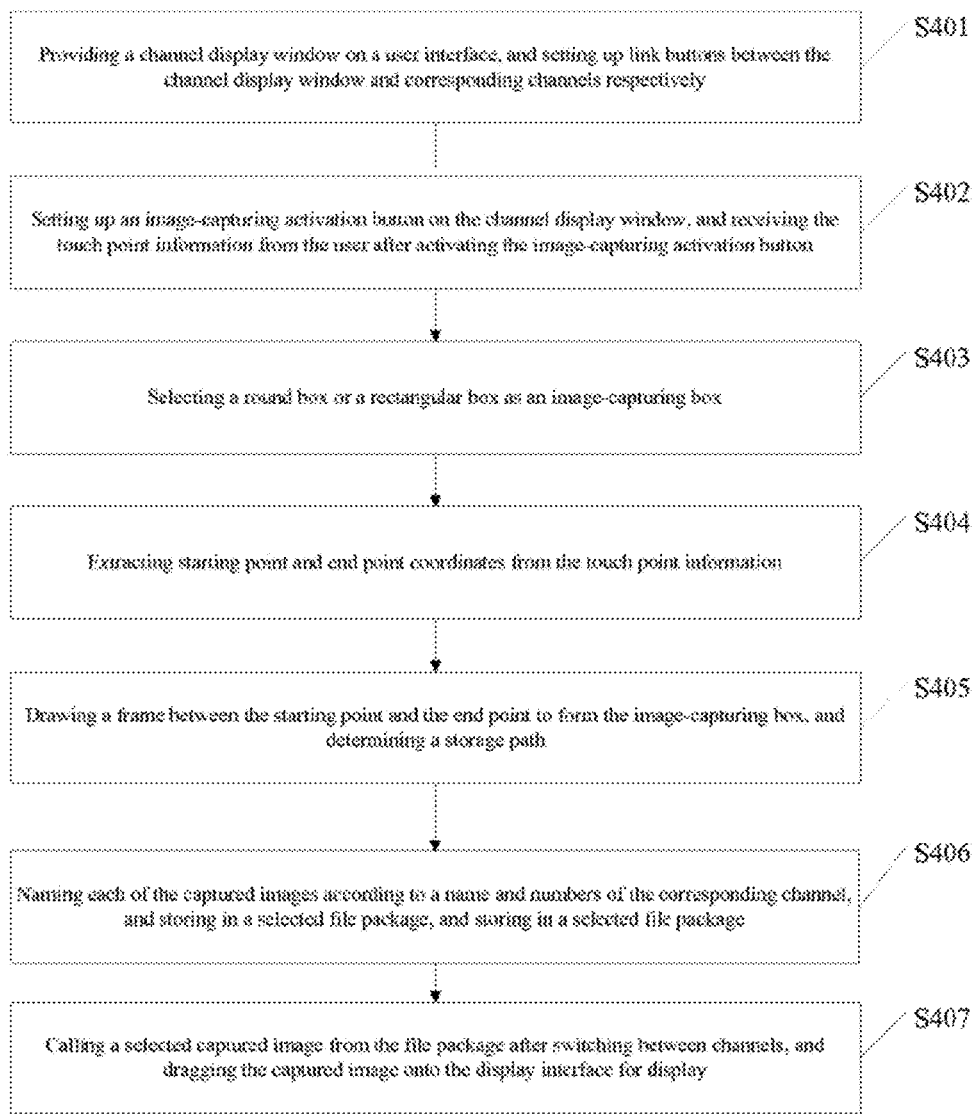
FIG. 4 is a flow diagram shown an embodiment of a method for multichannel touch control of an all-in-one machine to implement image-capturings in multiple channels according to the present invention.

FIG. 4 is a flow diagram shown an embodiment of a method for multichannel touch control of an all-in-one machine to implement image-capturing in multiple channels according to the present invention. The method includes:

S401, providing a channel display window on a user interface, and setting up link buttons between the channel display window and corresponding channels respectively;

S402, setting up an image-capturing activation button on the channel display window, and receiving the touch point information of the user after activating the image-capturing activation button;

S403, selecting a round box or a rectangular box as an image-capturing box;

S404, extracting starting point and end point coordinates from the touch point information;

S405, drawing a frame between the starting point and the end point to form the image-capturing box, and determining a storage path;

S406, naming each of the captured images according to a name of the corresponding channel and numbers, and storing in a selected file package; and S407, calling a selected captured image from the file package after switching between channels, and dragging the captured image onto the user interface for display.

The technical solution of this example can combine the method according to the Example One, including an Android user interface, a channel display window and a transparent annotation window configured to display an annotation. The channel display window is arranged on the Android user interface, and the size and location of the channel display window is adjustable. The transparent annotation window may overlay the channel display window.

The image with an annotation or without annotation may be captured. Firstly, the size, shape and location of the image-capturing box should be determined Preferably the image-capturing box may include a round box and a rectangular box. Forming an image-capturing box according to the touch point information includes:

selecting the round box or the rectangular box;

extracting starting point and end point coordinates from the touch point information;

drawing a frame between the starting point and the end point to form the image-capturing box, and determining a storage path; and inserting a cancellation prompt button that the round box or the rectangular box can be reselected when the cancellation prompt button is activated.

In order to perform operations on the middle channel display window layer when the transparent annotation layer is under operations, a rectangular region object with the same size of the channel display winder layer is defined in the transparent annotation layer, which is called as a transparent annotation window. When the user performs a selecting operation on the transparent annotation window, whether the operation is within the rectangular region of the channel display window is determined, and if so, the operation will be executed in the rectangular region. The result of the execution may be informed to the Android user interface layer, and the Android user interface layer may adjust the size or location of the channel display window. The operations on the channel display window may include moving and zooming in and out. In addition, there may be a link button for changing channel. When performing operations on the channel display window, a drop-down box with a list of available channels may be provided that if the user selects a channel, the channel display window layer may switch to the channel for display.

In addition, each of the captured images may be named according to a name of the corresponding channel and numbers, and may be stored in a selected file package.

In a preferred embodiment, when the user selects an operation of image-capturing, the system may start a service for image-capturing. The function of the service is to capture the content of whole screen, and store the content as a picture in a certain folder on a storage medium. When capturing the screen, the captured image is an image including content of other channels and with annotations, because the content of other channels and the annotations which have been made by the user on the channels are displayed in the screen.

Further, a deletion prompt button may be inserted. When the deletion prompt button is activated, the captured image that has been stored can be deleted.

The captured image may be selected according to the name of the image from the file package after switching between channels. And the captured image may be called and dragged onto the user interface for display. Thus, the acquired images corresponding to the multiple channels can be observed and compared after switching between channels.

Figure 5:
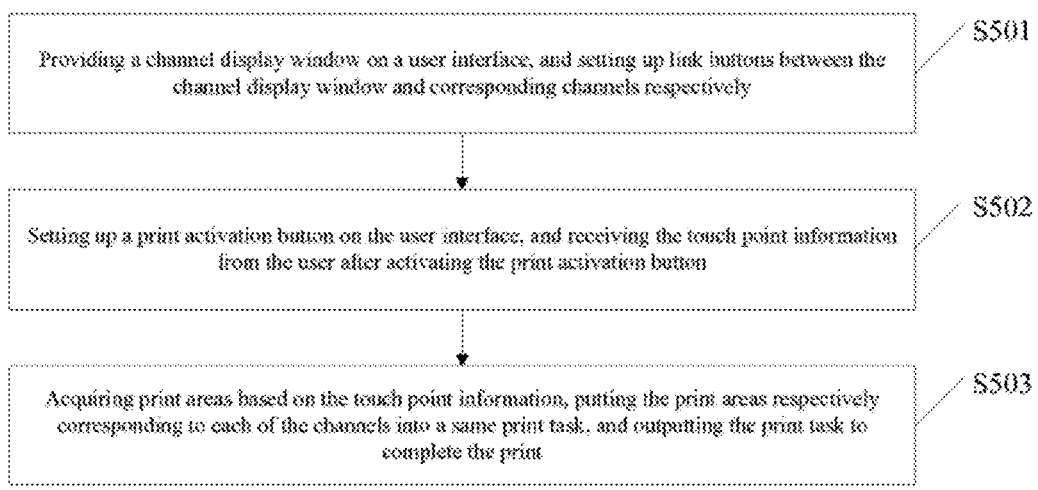
FIG. 5 is a flow diagram illustrating a method for multichannel touch control of an all-in-one machine according to Example Three of the present invention.

Please refer to FIG. 5, which is a flow diagram illustrating a method for multichannel touch control of an all-in-one machine according to Example Three of the present invention.

In the example, the method for multichannel touch control of an all-in-one machine can implement print for the multiple channels, including:

S501, providing a channel display window on a user interface, and setting up link buttons between the channel display window and corresponding channels respectively;

S502, setting up a print activation button on the user interface, and receiving the touch point information of the user after activating the print activation button; and S503, acquiring print areas based on the touch point information, putting the print areas respectively corresponding to each of the channels into the same print task, and outputting the print task to complete the print.

The technical solution of this example can combine the method according to the Example One. A transparent annotation window may overlay the channel display window, which is transparent, so the feel of the image cannot be affected. The transparent annotation window can receive touch point information of the user, and covert the touch point information into a visual figure, character or line, which can be shown on the image as an annotation. The annotations respectively corresponding to each of the channels can be stored so as to display each of the annotations on the image at the same time. In the meantime, the present invention is convenient to put the pages to be printed in respective channels into the same print task to output without switching the system, which saves testing time. The pages of all of the channels can be printed by driving an external printer only once, which does not take up too much of the channel resources of the printer. In particular, the image of the whole screen with the annotation in each channel can be printed, the image shown on the whole channel display window can be also printed, and a certain area captured from the channel display window can be further printed. The above same print task includes at least one page to be printed.

Figure 6:
FIG. 6 is a flow diagram shown an embodiment of a method for multichannel touch control of an all-in-one machine to implement print of content in multiple channels according to the present invention.

FIG. 6 is a flow diagram shown an embodiment of a method for multichannel touch control of an all-in-one machine to implement print of content in multiple channels according to the present invention. The method includes:

S601, providing a channel display window on a user interface, and setting up link buttons between the channel display window and corresponding channels respectively;

S602, setting up an image-capturing activation button on the channel display window, and receiving the touch point information of the user after activating the image-capturing activation button;

S603, extracting starting point and end point coordinates from the touch point information;

S604, drawing a frame between the starting point and the end point to form a print image box, and storing the image box or the image in that box in a temporary folder;

S605, selecting target print image boxes to be printed from the temporary folder, and arranging the target print image boxes on the same page to be printed;

S606, outputting a print task to complete the print; and

S607, deleting the print image box corresponding to the print area stored in the temporary folder.

Preferably, between the step S605 and the step S606, it may further include:

adjusting the size and/or location of each target print image box in the page to be printed; and/or deleting the selected target print image box in the page to be printed.

The technical solution of this example can combine the method according to the Example One, including an Android user interface, a channel display window and a transparent annotation window configured to display an annotation. The channel display window is arranged on the Android user interface, and the size and location of the channel display window is adjustable. The transparent annotation window may overlay the channel display window.

In addition, the print area should be determined before printing the image with an annotation or without annotation. Preferably, the acquiring print areas based on the touch point information may include:

extracting starting point and end point coordinates from the touch point information; and drawing a frame between the starting point and the end point to form the print image box, and storing the print image box in the temporary folder.

Outputting the whole screen or the whole channel display window as a page to be printed can create a print task simply, but the page to be printed may undoubtedly include much unnecessary information, such as menu bar. Extracting starting point and end point coordinates from the touch point information to form a print image box can help the user to select a print area independently, to save paper and print cartridge.

In order to further save the printing paper, the target print image boxes to be printed can be selected from the temporary folder to be arranged on the same page to be printed.

If a print image box is arranged on a page to be printed, there may be some blank space left on the printed page, because the print image box is a mall area captured by the user. The plurality of print image boxes stored in the temporary folder can be arranged on the same page to be printed in this embodiment, so it can make use of the space of the printed page to save printing paper. Preferably, the user can select a target print image box from the temporary folder and arrange the print areas of a number of channels which are related to each other on the same page to be printed, which is convenient for the user to read and compare to enhance the user experience.

Adjusting the size and/or location of each target print image box in the page to be printed; and/or deleting the selected target print image box in the page to be printed.

In addition, after selecting the target print image boxes and arranging the target print image boxes on the same page to be printed, the user can adjust the size of each target print image box in the page to be printed by zooming, to save space. The user can also adjust the location of each target print image box in the page to be printed by dragging, to edit the space of the page to be printed. When the user needs to cancel a certain print image box, the user may remove the print image box by a deletion operation.

Finally, when the print task has been output and completed, the print image boxes corresponding to the print areas stored in the temporary folder can be deleted. Preferably, the system may delete the print image boxes just stored in the temporary folder to save storage space. Alternatively, the user can store the relevant files which have been printed in a fixed folder for later calling.

The embodiments of the method for multichannel touch control of an all-in-one machine according to the present invention can be implemented in a coordinated way or an alternative way, that is, with the method for multichannel touch control of an all-in-one machine according to the present invention, one of annotation, image-capturing and print for multiple channels or their combination can be implemented. An all-in-one machine may have the function of annotation, image-capturing or print for multiple channels respectively, or have all of the functions of annotation, image-capturing and print for multiple channels.

Figure 7:
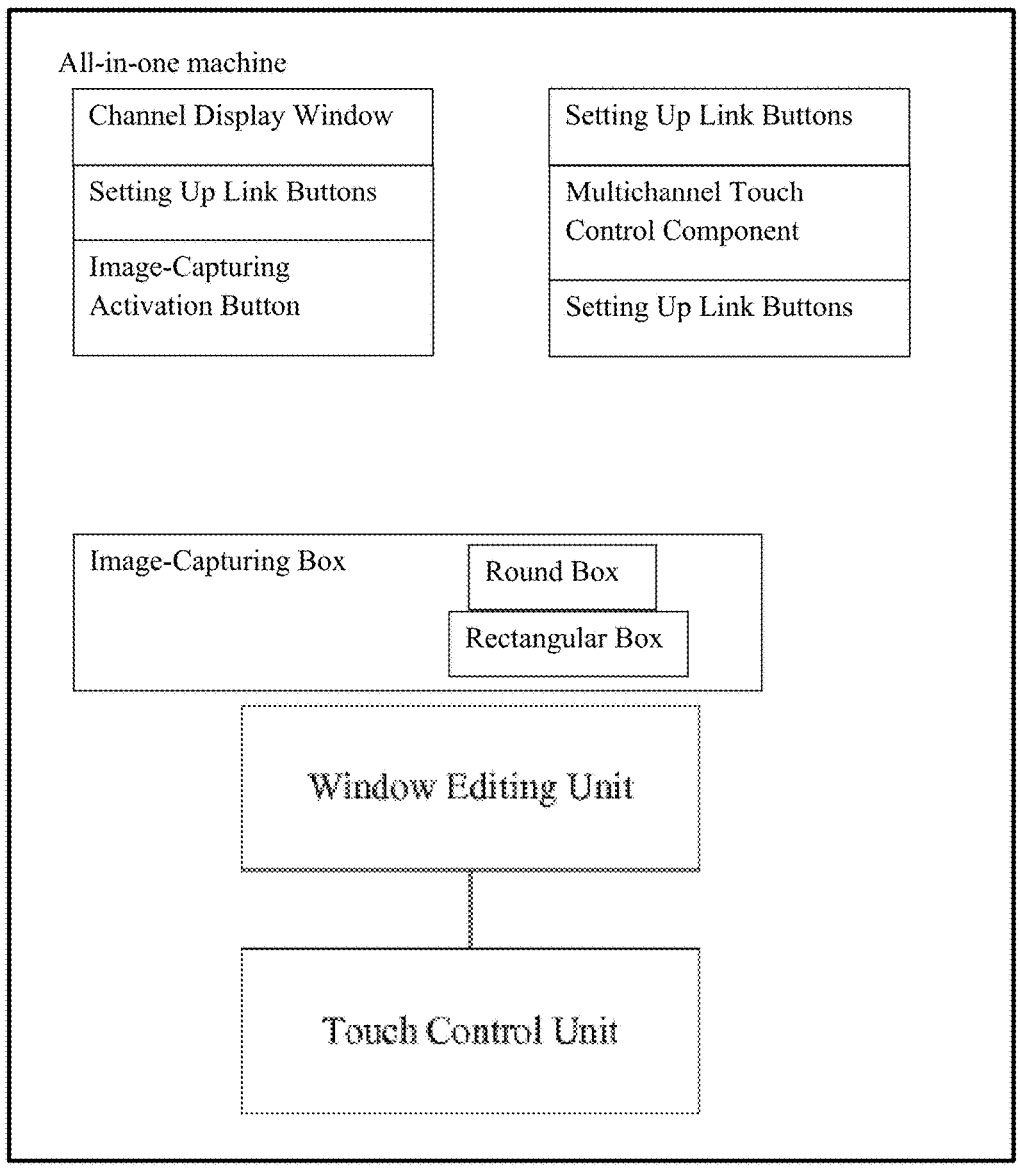
FIG. 7 is a schematic diagram illustrating a device for multichannel touch control of an all-in-one machine according to certain embodiments of the present invention.

Please refer to FIG. 7, which is a schematic diagram illustrating a device for multichannel touch control of an all-in-one machine according to certain embodiments of the present invention. The device for multichannel touch control of an all-in-one machine includes:

a window editing unit, configured to provide a channel display window on a user interface, and set up link buttons between the channel display window and corresponding channels respectively; and a touch control unit, configured to set up a multichannel touch control component on the user interface, receive touch point information from a user, convert the touch point information into corresponding multichannel operation information, and perform respective operation on each channel based on the multichannel operation information.

In the device for multichannel touch control of an all-in-one machine, the display content of the multiple channels can be displayed by providing a channel display window on the user interface of the all-in-one machine with the window editing unit. The touch control unit can set up the multichannel touch control component on the user interface, and the touch control operation on the multiple channels at the same time can be activated with the multichannel touch control component, for example, the display content of the multiple channels can be annotated, captured or printed at the same time, without having to respectively switch to the respective channel before performing the corresponding operation in the channel. In addition, it is convenient to switch between the multiple channels by the respective link button set up between the channel display window and the respective channel.

Figure 8:
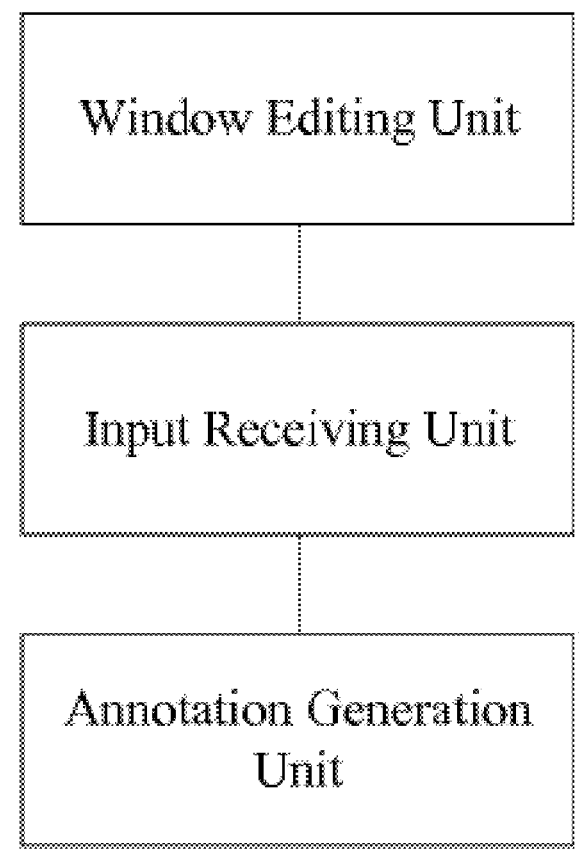
FIG. 8 is a schematic diagram illustrating a device for multichannel touch control of an all-in-one machine according to Example One of the present invention.

Please refer to FIG. 8, which is a schematic diagram illustrating a device for multichannel touch control of an all-in-one machine according to Example One of the present invention. In this example, the device for multichannel touch control of an all-in-one machine includes:

a window editing unit, configured to provide a channel display window on a user interface, and set up link buttons between the channel display window and corresponding channels respectively;

an input receiving unit coupled to the window editing unit, configured to provide a transparent annotation window above the channel display window and receive touch point information from a user; and an annotation generation unit coupled to the input receiving unit, configured to convert the touch point information into annotations and store the annotations respectively corresponding to each of the channels.

That is, the touch control unit of the device for multichannel touch control of the all-in-one machine includes the input receiving unit and the annotation generation unit.

The operation mode of the units of the device for multichannel touch control of the all-in-one machine in this example is the same as the method for multichannel touch control of the all-in-one machine in the Example One.

Figure 9:
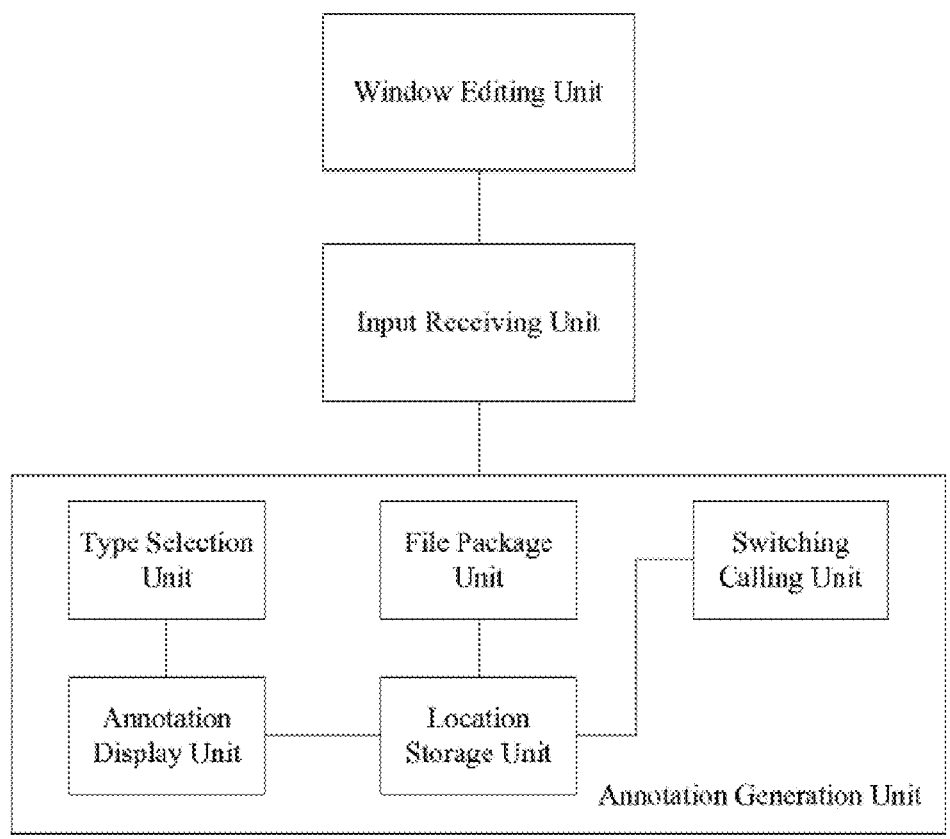
FIG. 9 is a schematic diagram shown an embodiment of a device for multichannel touch control of an all-in-one machine to implement annotations in multiple channels according to the present invention.

FIG. 9 is a schematic diagram shown an embodiment of a device for multichannel touch control of an all-in-one machine to implement annotations in multiple channels according to the present invention. As shown in FIG. 9, the annotation generation unit includes:

a type selection unit, configured to collect the touch point information according to the type of the annotation; and an annotation display unit coupled to the type selection unit, and configured t connect the touch points into a line with a predefined color to form an annotation and display the annotation on the channel preview window in the current channel corresponding to the annotation.

As shown in FIG. 9, the annotation generation unit further includes:

a file package unit, configured to create a graphic file package, a line file package and/or text file package respectively; and a location storage unit coupled to the file package unit and the annotation display unit respectively, configured to store the annotation in a corresponding file package according to the type of the annotation and a coordinate location of the annotation with respect to the channel corresponding to the annotation.

As shown in FIG. 9, it further includes a switching calling unit coupled to the location storage unit, configured to call all of the annotations corresponding to the current channel from all file packages after switching to the current channel, and display the annotations according to their coordinate locations respectively.

In another embodiment, the annotation generation unit includes:

a pattern selection unit (not shown), configured to select the target style from the graphics library or the line library;

a location annotation unit (not shown), configured to acquire coordinates of a starting point and an end point of the touch point information; and a graphics display unit (not shown) coupled to the type selection unit and the location annotation unit respectively, configured to draw a graphic element or a line of the target style between the starting point and the end point to form an annotation and display the annotation on the channel preview window in the current channel corresponding to the annotation.

The operation mode of the units of the device for multichannel touch control of the all-in-one machine in this example is the same as the method for multichannel touch control of the all-in-one machine in the Example One.

Figure 10:
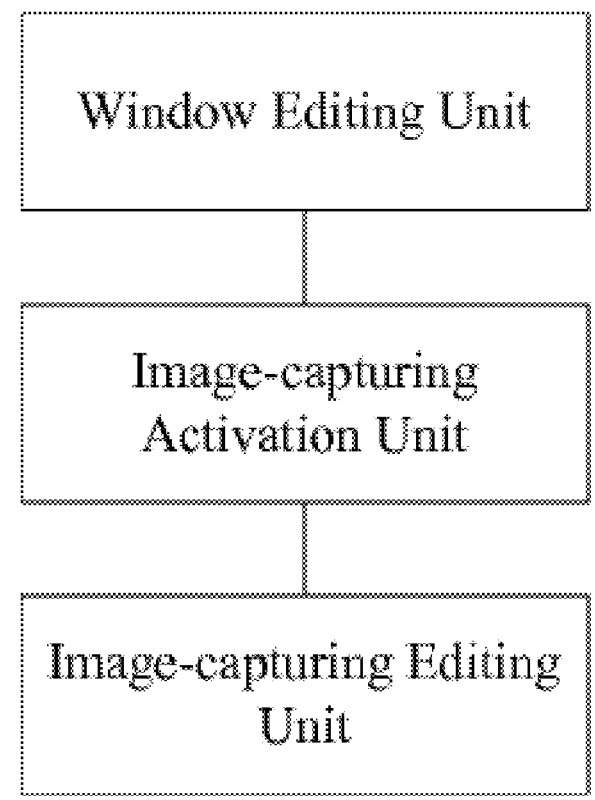
FIG. 10 is a schematic diagram illustrating a device for multichannel touch control of an all-in-one machine according to Example Two of the present invention.

Please refer to FIG. 10, which is a schematic diagram illustrating a device for multichannel touch control of an all-in-one machine according to Example Two of the present invention. The device includes:

a window editing unit, configured to provide a channel display window on a user interface, and set up link buttons between the channel display window and corresponding channels respectively;

an image-capturing activation unit coupled to the window editing unit, configured to receive the touch point information of the user after activating an image-capturing activation button on the user interface; and an image-capturing editing unit coupled to the image-capturing activation unit, configured to create an image-capturing box based on the touch point information and store the images captured by the image-capturing box respectively corresponding to each of the channel.

That is, the touch control unit of the device for multichannel touch control of the all-in-one machine includes the image-capturing activation unit and the image-capturing editing unit.

The operation mode of the units of the device for multichannel touch control of the all-in-one machine in this example is the same as the method for multichannel touch control of the all-in-one machine in the Example Two.

Figure 11:
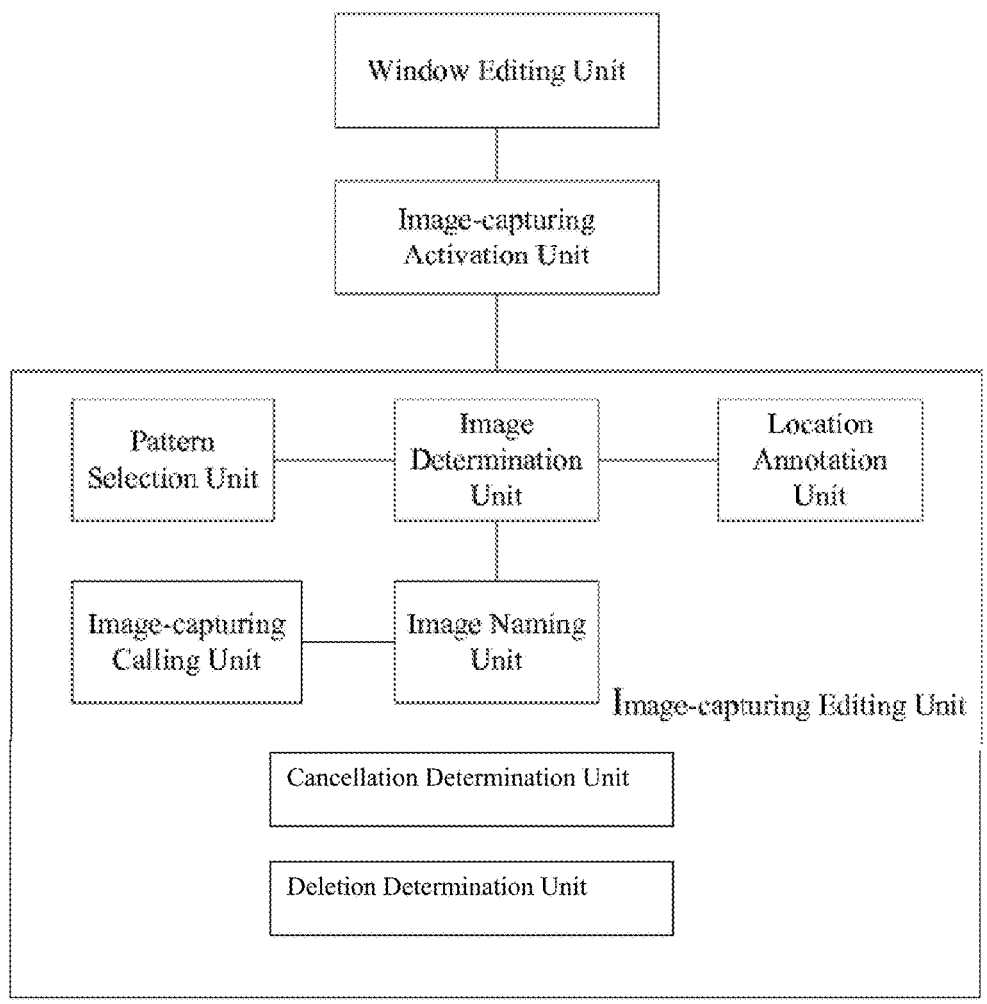
FIG. 11 is a schematic diagram illustrating a device for multichannel touch control of an all-in-one machine according to an embodiment of Example Two of the present invention.

FIG. 11 is a schematic diagram illustrating a device for multichannel touch control of an all-in-one machine according to an embodiment of Example Two of the present invention. As show in FIG. 11, the image-capturing box includes a round box and a rectangular box. The image-capturing editing unit includes:

a pattern selection unit, configure to select the round box or rectangular box;

a location annotation unit, configured to acquire coordinates of a starting point and an end point of the touch point information; and an image determination unit coupled to the pattern selection unit and the location annotation unit respectively, configured to draw a box between the starting point and the end point to form the image-capturing box and determine a storage path.

As shown in FIG. 11, the image determination unit includes:

a cancellation determination unit, configured to insert a cancellation prompt button that the round box or the rectangular box can be reselected when the cancellation prompt button is activated; and/or a deletion determination unit, configured to insert a deletion prompt button that the captured image that has been stored can be deleted when the deletion prompt button is activated.

As shown in FIG. 11, the image-capturing editing unit further includes an image naming unit coupled to the image determination unit, configured to name each of the captured images according to a name of the corresponding channel and numbers and store in a selected file package.

As shown in FIG. 11, the device further includes an image-capturing calling unit coupled to the image naming unit, configured to select a captured image from the file package according to the name of the image after switching between channels, call the captured image, and drag the captured image onto the user interface for display.

The operation mode of the units of the device for multichannel touch control of the all-in-one machine in this example is the same as the method for multichannel touch control of the all-in-one machine in the Example Two.

Figure 12:
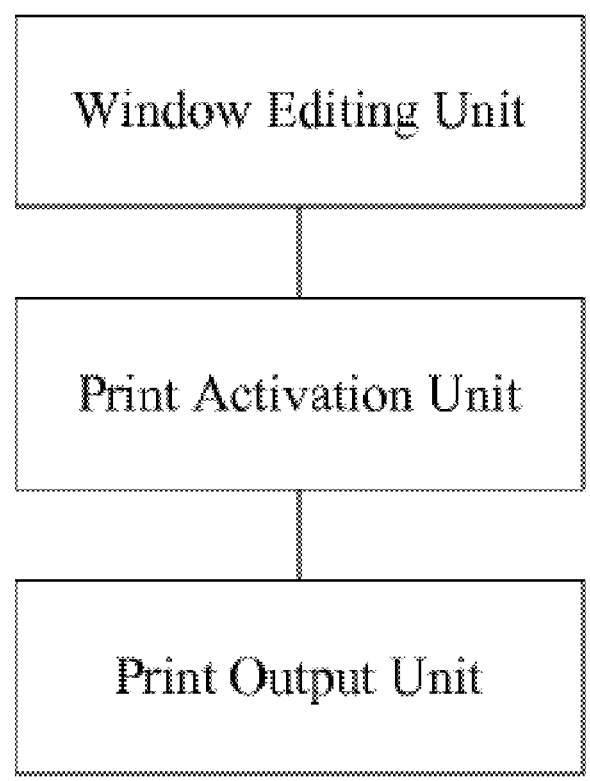
FIG. 12 is a schematic diagram illustrating a device for multichannel touch control of an all-in-one machine according to Example Three of the present invention.

Please refer to FIG. 12, which is a schematic diagram illustrating a device for multichannel touch control of an all-in-one machine according to Example Three of the present invention. The device includes:

a window editing unit, configured to provide a channel display window on a user interface, and set up link buttons between the channel display window and corresponding channel respectively;

a print activation unit coupled to the window editing unit, configured to set up a print activation button on the user interface, and receive the touch point information of the user after the print activation button is activated; and a print output unit coupled to the print activation unit, configured to acquire print areas based on the touch point information, put the print areas respectively corresponding to each of the channels into the same print task, and output the print task to complete the print.

The operation mode of the units of the device for multichannel touch control of the all-in-one machine in this example is the same as the method for multichannel touch control of the all-in-one machine in the Example Three.

Figure 13:
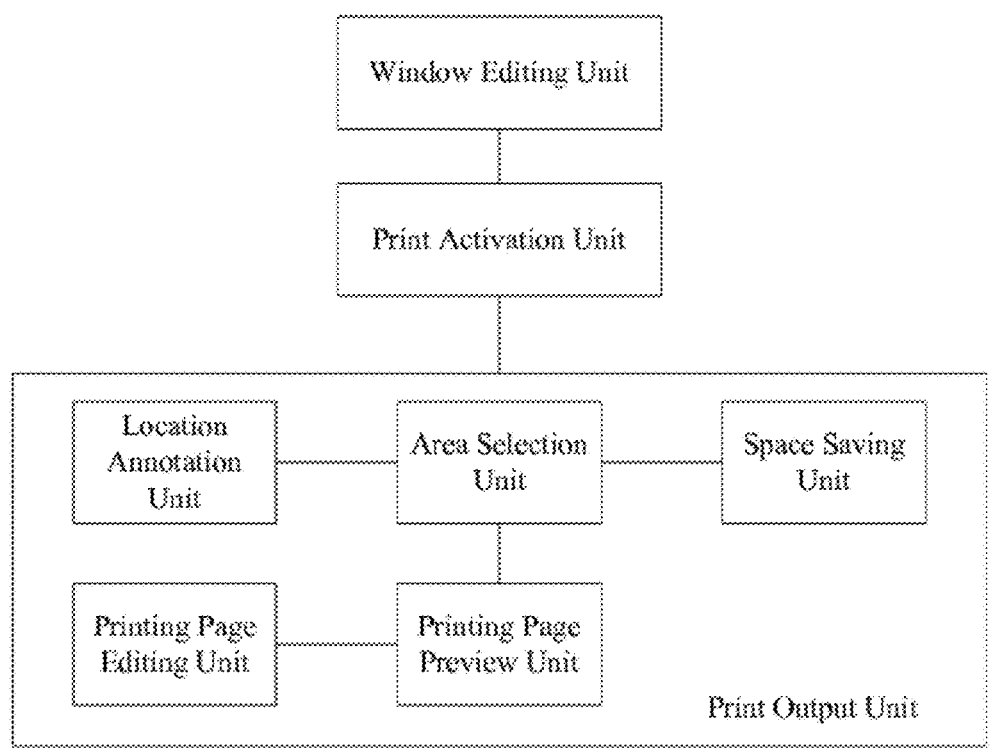
FIG. 13 is a schematic diagram illustrating a device for multichannel touch control of an all-in-one machine according to an embodiment of Example Three of the present invention.

FIG. 13 is a schematic diagram illustrating a device for multichannel touch control of an all-in-one machine according to an embodiment of Example Three of the present invention. The print output unit includes:

a location annotation unit, configured to acquire coordinates of a starting point and an end point of the touch point information; and an area selection unit coupled to the location annotation unit, configured to draw a box between the starting point and the end point to form a print image box, and store the image box or the image in that box in a temporary folder.

As shown in FIG. 13, it further includes a printing page preview unit coupled to the area selection unit, configured to select target print image boxes to be printed from the temporary folder, and arrange the target print image boxes on the same page to be printed.

As shown in FIG. 13, it further includes a printing page editing unit coupled to the printing page preview unit, configured to adjust the size and/or location of each target print image box in the page to be printed, or delete the selected target print image box in the page to be printed.

In one embodiment, the present invention further includes a space saving unit, configured to delete the print image box corresponding to the print area stored in the temporary folder.

The operation mode of the units of the device for multichannel touch control of the all-in-one machine in this example is the same as the method for multichannel touch control of the all-in-one machine in the Example Three.

It will be appreciated for those skilled in the art that parts of or overall process and corresponding devices or units in the above embodiments can be implemented by related hardware controlled by computer program, the computer program can be stored in a computer-readable storage medium, and when the computer program is executed, it can include the processes of the above embodiments of each method. Wherein, the non-transitory computer-readable storage medium can be a disc, a compact disc, a Read-Only Memory or a Random Access Memory. Thus, according to the above embodiments of the present invention, a computer-readable storage medium is further provided. When the computer program stored in the computer-readable storage medium is executed, it can implement any of the above methods for multichannel touch control of an all-in-one machine.

The methods in the embodiments according to the present invention as mentioned above can be in a form of software and installed in a corresponding device, and the process of performing remote control on the external computer can be implemented by related process unit controlled by the software when the software is running. The above process unit may be arranged or installed in a corresponding terminal device, or itself may be a corresponding terminal device accordingly, such as mobile phone, tablet computer, PDA (Personal Digital Assistant), POS (Point of Sales), onboard computer or any other terminal devices.

Based on the method, device and computer storage medium for multichannel touch control of the all-in-one machine according to the present invention, the present invention also provide a terminal device or server which is installed with the computer storage medium and can perform any of the methods for multichannel touch control of the all-in-one machine in accordance with the present invention. The terminal device may be a mobile phone, tablet PC, PDA (Personal Digital Assistant), POS (Point of Sales), onboard computer or any terminal device may need to perform touch control on multiple channels.

The above are preferred embodiments of the invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

The invention claimed is:

1. A method for multichannel touch control of an all-in-one machine including an integrative equipment which combines the functions of TV, touch and PC, comprising the steps of:
providing a channel display window on a user interface, and setting up link buttons between the channel display window and corresponding channel respectively; and
setting up a multichannel touch control component on the user interface, receiving touch point information from a user, converting the touch point information into corresponding multichannel operation information, and performing operation on each channel based on the multichannel operation information,
wherein the all-in-one machine includes a device for multichannel touch control comprising:
a window editing unit, configured to provide a channel display window on a user interface, and set up link buttons between the channel display window and corresponding channels respectively; and
a touch control unit, configured to set up a multichannel touch control component on the user interface, receive touch point information from a user, convert the touch point information into corresponding multichannel operation information, and perform corresponding operation on each channel based on the multichannel operation information,
an image-capturing activation unit coupled to the window editing unit, configured to receive the touch point information of the user upon the user's tap on an image-capturing activation button on the user interface;
an image-capturing editing unit coupled to the image-capturing activation unit, configured to create an image-capturing box based on the touch point information and store the images captured by the image-capturing box corresponding to each of the channels, comprising an image naming unit coupled to the image determination unit, configured to name each of the captured images according to a name of the corresponding channel and numbers and store in a selected file package; and
an image-capturing calling unit coupled to the image naming unit, configured to select a captured image from the file package according to the name of the image after switching between channels, call and drag the captured image onto the user interface for display,
wherein the image-capturing box comprises a round box or a rectangular box, and the image-capturing editing unit comprises:
a pattern selection unit, configure to select the round box or rectangular box;
a location annotation unit, configured to acquire coordinates of a starting point and an end point of the touch point information; and
an image determination unit coupled to the pattern selection unit and the location annotation unit, configured to draw a box between the starting point and the end point to form the image-capturing box and determine a storage path, comprising:
a cancellation determination unit, configured to insert a cancellation prompt button, which, when activated, allows to reselect the round box or the rectangular box; and
a deletion determination unit, configured to insert a deletion prompt button, which, when activated, allows to delete the captured image that has been stored.

2. The method of claim 1, wherein the step of setting up a multichannel touch control component on the user interface, receiving touch point information from a user, converting the touch point information into corresponding multichannel operation information, and performing operation on each channel based on the multichannel operation information comprises:
providing a transparent annotation window above the channel display window, receiving touch point information from a user, converting the touch point information into annotations, and storing the annotations corresponding to each of the channels respectively.

3. The method of claim 2, wherein the types of the annotation comprise graphic annotation, line annotation and/or text annotation, and the step of converting the touch point information into annotations comprises:
collecting the touch point information according to the type of the annotation; and
connecting the touch points into a line with a predefined color to form an annotation, and displaying the annotation on the channel preview window in the current channel corresponding to the annotation;
and wherein the annotation comprises a graphics library and a line library storing preset patterns, and the step of converting the touch point information into annotations further comprises:
selecting the target style from the graphics library or the line library;
extracting starting point and end point coordinates from the touch point information; and
drawing a target style between the starting point and the end point to form an annotation, and displaying the annotation on the channel preview window in the current channel corresponding to the annotation.

4. The method of claim 2, wherein the step of storing the annotations corresponding to each of the channels comprises:
creating a graphic file package, a line file package and/or text file package respectively;
storing the annotation in a corresponding file package according to the type of the annotation, together with a coordinate location of the annotation with respect to the channel corresponding to the annotation;
calling all of the annotations corresponding to the current channel from all file packages after switching to the current channel; and
displaying the annotations according to their coordinate locations respectively.

5. The method of claim 4, wherein the image-capturing box comprises a round box or a rectangular box, and the creating an image-capturing box based on the touch point information comprises:
selecting the round box or rectangular box;
extracting starting point and end point coordinates from the touch point information; and
drawing a frame between the starting point and the end point to form the image-capturing box, and determining a storage path.

6. The method of claim 1, wherein the step of setting up a multichannel touch control component on the user interface, receiving touch point information from a user, converting the touch point information into corresponding multichannel operation information, and performing operation on each channel based on the multichannel operation information comprises:
setting up an image-capturing activation button on the channel display window, and receiving the touch point information of the user after activating the image-capturing activation button;
creating an image-capturing box based on the touch point information, naming each of the captured images according to a name and number of the corresponding channel, and storing the captured image in a selected file package;
selecting a captured image from the file package according to the name of the image after switching between channels; and
calling and dragging the captured image onto the user interface for display.

7. The method of claim 6, wherein the method further comprises, after selecting target print image boxes to be printed from the temporary folder, and arranging the target print image boxes on the same page to be printed, the step of:
adjusting the size and/or location of each target print image box in the page to be printed; or
deleting the selected target print image box in the page to be printed.

8. The method of claim 1, wherein the step of setting up a multichannel touch control component on the user interface, receiving touch point information from a user, converting the touch point information into corresponding multichannel operation information, and performing operation on each channel based on the multichannel operation information comprises:
setting up a print activation button on the user interface, and receiving the touch point information of the user after activating the print activation button;
extracting starting point and end point coordinates from the touch point information, drawing a frame between the starting point and the end point to form a print image box, and storing the image box or the image in that box in a temporary folder;
selecting target print image boxes to be printed from the temporary folder, and arranging the target print image boxes on the same page to be printed, to put the print areas corresponding to each of the channels into the same print task; and
outputting the print task to complete the print, and deleting the print image boxes corresponding to the print areas stored in the temporary folder.

9. A non-transitory computer-readable storage medium storing computer-executable instructions which, when executed, cause a computer to perform the method for multichannel touch control of an all-in-one machine of claim 1.

10. A device for multichannel touch control of an all-in-one machine including an integrative equipment which combines the functions of TV, touch and PC, comprising:
a window editing unit, configured to provide a channel display window on a user interface, and set up link buttons between the channel display window and corresponding channels respectively; and
a touch control unit, configured to set up a multichannel touch control component on the user interface, receive touch point information from a user, convert the touch point information into corresponding multichannel operation information, and perform corresponding operation on each channel based on the multichannel operation information,
an image-capturing activation unit coupled to the window editing unit, configured to receive the touch point information of the user upon the user's tap on an image-capturing activation button on the user interface;
an image-capturing editing unit coupled to the image-capturing activation unit, configured to create an image-capturing box based on the touch point information and store the images captured by the image-capturing box corresponding to each of the channels, comprising an image naming unit coupled to the image determination unit, configured to name each of the captured images according to a name of the corresponding channel and numbers and store in a selected file package; and an image-capturing calling unit coupled to the image naming unit, configured to select a captured image from the file package according to the name of the image after switching between channels, call and drag the captured image onto the user interface for display, wherein the image-capturing box comprises a round box or a rectangular box, and the image-capturing editing unit comprises:

a pattern selection unit, configure to select the round box or rectangular box;

a location annotation unit, configured to acquire coordinates of a starting point and an end point of the touch point information; and an image determination unit coupled to the pattern selection unit and the location annotation unit, configured to draw a box between the starting point and the end point to form the image-capturing box and determine a storage path, comprising:

a cancellation determination unit, configured to insert a cancellation prompt button, which, when activated, allows to reselect the round box or the rectangular box; and a deletion determination unit, configured to insert a deletion prompt button, which, when activated, allows to delete the captured image that has been stored.

11. The device of claim 10, wherein the touch control unit comprising:

an input receiving unit coupled to the window editing unit, configured to provide a transparent annotation window above the channel display window and receive touch point information from a user; and an annotation generation unit coupled to the input receiving unit, configured to convert the touch point information into annotations and store the annotations corresponding to each of the channels.

12. The device of claim 11, wherein the types of the annotation comprise graphic annotation, line annotation and/or text annotation, and the annotation generation unit comprises:

a type selection unit, configured to collect the touch point information according to the type of the annotation; and an annotation display unit coupled to the type selection unit, configured to connect the touch points into a line with a predefined color to form an annotation, and display the annotation on the channel preview window in the current channel corresponding to the annotation.

13. The device of claim 11, wherein the annotation comprises a graphics library and a line library storing preset patterns, and the annotation generation unit comprises:

a pattern selection unit, configured to select a target style from the graphics library or the line library;

a location annotation unit, configured to acquire coordinates of a starting point and an end point of the touch point information; and a graphics display unit coupled to the type selection unit and the location annotation unit respectively, configured to draw a target style between the starting point and the end point to form an annotation and display the annotation on the channel preview window in the current channel corresponding to the annotation.

14. The device of claim 11, wherein the annotation generation unit further comprises:

a file package unit, configured to create a graphic file package, a line file package and/or text file package respectively; and a location storage unit coupled to the file package unit and the annotation display unit respectively, configured to store the annotation in a corresponding file package according to the type of the annotation and a coordinate location of the annotation with respect to the channel corresponding to the annotation.

15. The device of claim 14, further comprising:

a switching calling unit coupled to the location storage unit, configured to call all of the annotations corresponding to the current channel from all file packages after switching to the current channel, and display the annotations according to their coordinate locations respectively.

16. The device of claim 10, wherein the touch control unit comprises:

a print activation unit coupled to the window editing unit, configured to set up a print activation button on the user interface, and receive the touch point information of the user after the print activation button is activated; and a print output unit coupled to the print activation unit, configured to acquire print areas based on the touch point information, put the print areas corresponding to each of the channels into the same print task, and output the print task to complete the print.

17. The device of claim 16, wherein the print output unit comprises:

a location annotation unit, configured to acquire coordinates of a starting point and an end point of the touch point information;

an area selection unit coupled to the location annotation unit, configured to draw a box between the starting point and the end point to form a print image box, and store the image box or the image in that box in a temporary folder;

a printing page preview unit coupled to the area selection unit, configured to select target print image boxes to be printed from the temporary folder, and arrange the target print image boxes on the same page to be printed;

a printing page editing unit coupled to the printing page preview unit, configured to adjust the size and/or location of each target print image box in the page to be printed, or delete the selected target print image box in the page to be printed.

18. The device of claim 16, further comprising:

a space saving unit, configured to delete the print image box corresponding to the print area stored in the temporary folder.

* * * * *